United States Patent [19]

Tung et al.

[11] Patent Number: 4,598,283

[45] Date of Patent: Jul. 1, 1986

[54] METHOD FOR CONVERTING THE NUMBER OF BITS OF INPUT BIT STREAM

[75] Inventors: Min-Hsiung G. Tung, Matthews, N.C.; Hiroshi Yanagisawa, Yokohama, Japan

[73] Assignee: International Business Machines Corporation, Armonk, N.Y.

[21] Appl. No.: 621,824

[22] Filed: Jun. 18, 1984

[30] Foreign Application Priority Data

Aug. 25, 1983 [JP] Japan .................................. 58-154228

[51] Int. Cl.⁴ ............................................. G09G 1/16
[52] U.S. Cl. .................................. 340/731; 340/735; 340/723; 382/47
[58] Field of Search ............... 340/731, 723, 735, 728, 340/748, 789; 382/47

[56] References Cited

U.S. PATENT DOCUMENTS

| | | | |
|---|---|---|---|
| 4,090,188 | 5/1978 | Suga | 340/731 |
| 4,107,662 | 8/1978 | Endo et al. | 340/731 |
| 4,367,533 | 1/1983 | Wiener | 340/731 |
| 4,447,882 | 5/1984 | Walz | 382/47 |
| 4,476,464 | 10/1984 | Hobbs | 340/731 |
| 4,555,191 | 11/1985 | Gojo | 340/735 |

FOREIGN PATENT DOCUMENTS

| | | | |
|---|---|---|---|
| 149120A | 7/1985 | European Pat. Off. | 382/47 |
| 5511491 | 4/1982 | Japan . | |
| WO84/00223 | 1/1984 | PCT Int'l Appl. | 340/731 |

*Primary Examiner*—Gerald L. Brigance
*Attorney, Agent, or Firm*—H. F. Somermeyer

[57] ABSTRACT

An image scaling method and apparatus partitions each line of image pel (print element) indicating bits into a number of bit groups equal to the number of bits to be added or deleted from the line to achieve a desired scaling. In each of the bit groups, one pel is added for enlargement or one pel is deleted for reduction. The pel addition or deletion occurs at pairs of like-pel indicating bits. If any bit groups has no pairs of like-pel indicating bits, a pel indicating bit is added for enlargement or deleting for reduction in an arbitrary location in the bit group.

11 Claims, 5 Drawing Figures

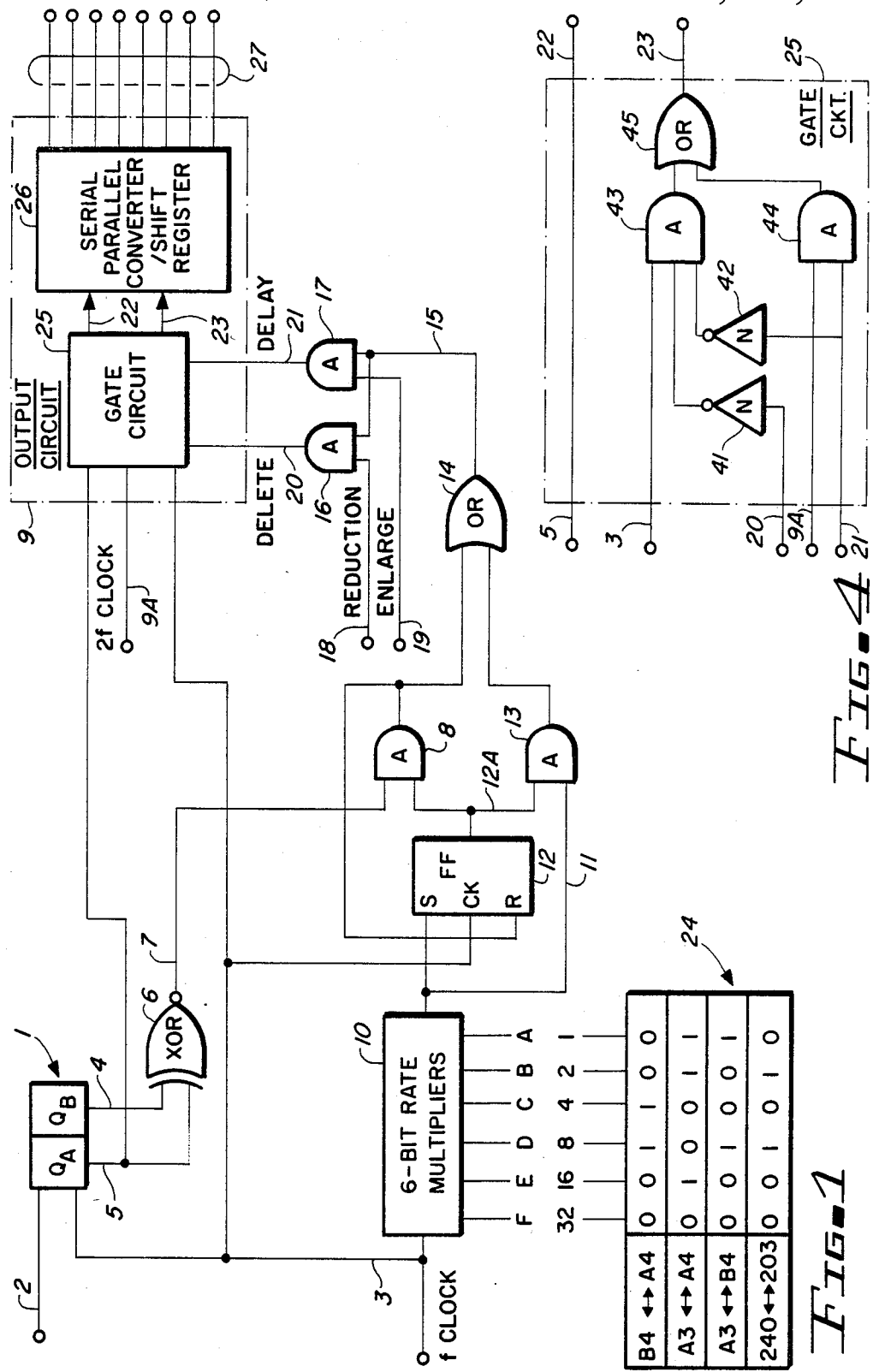

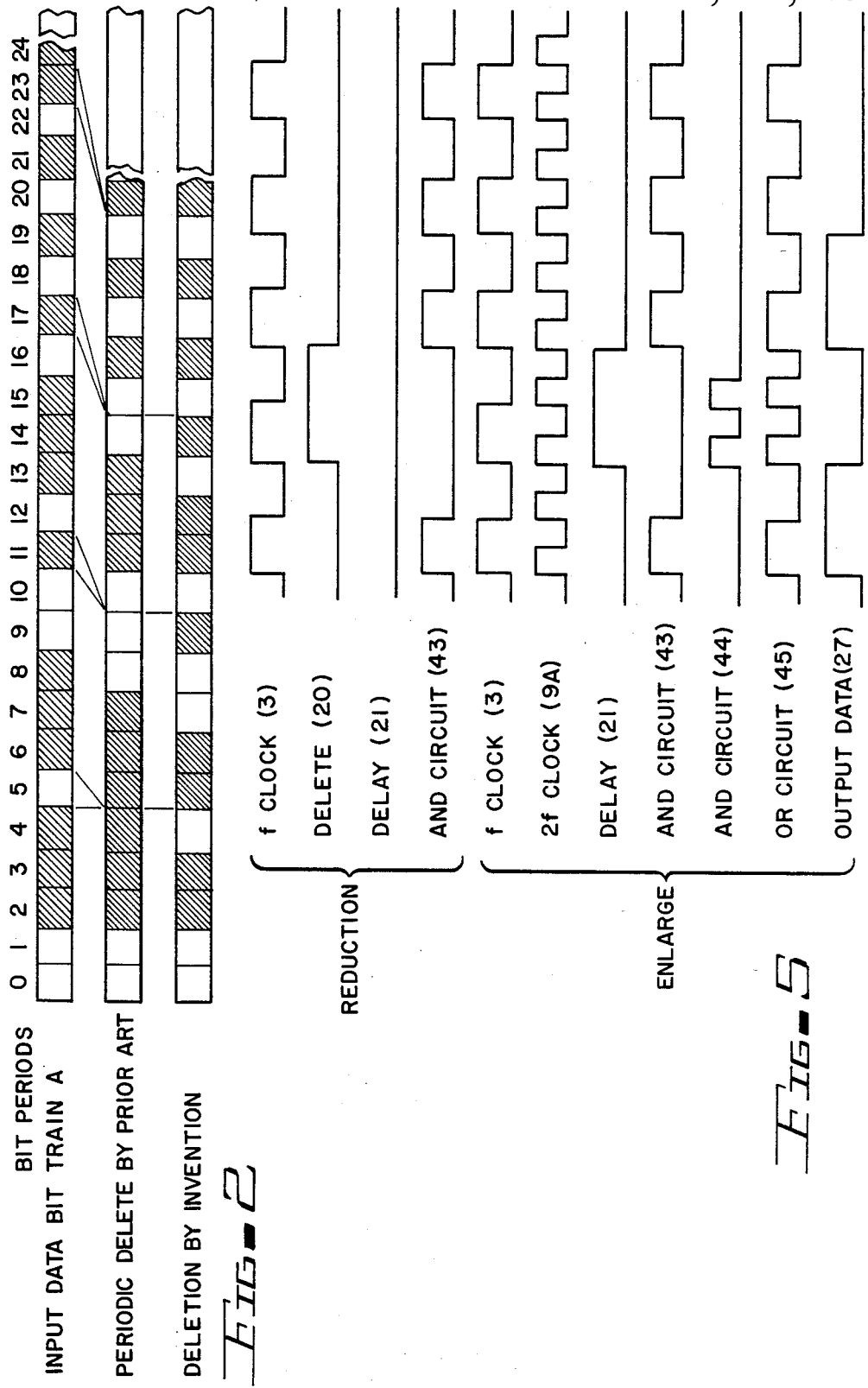

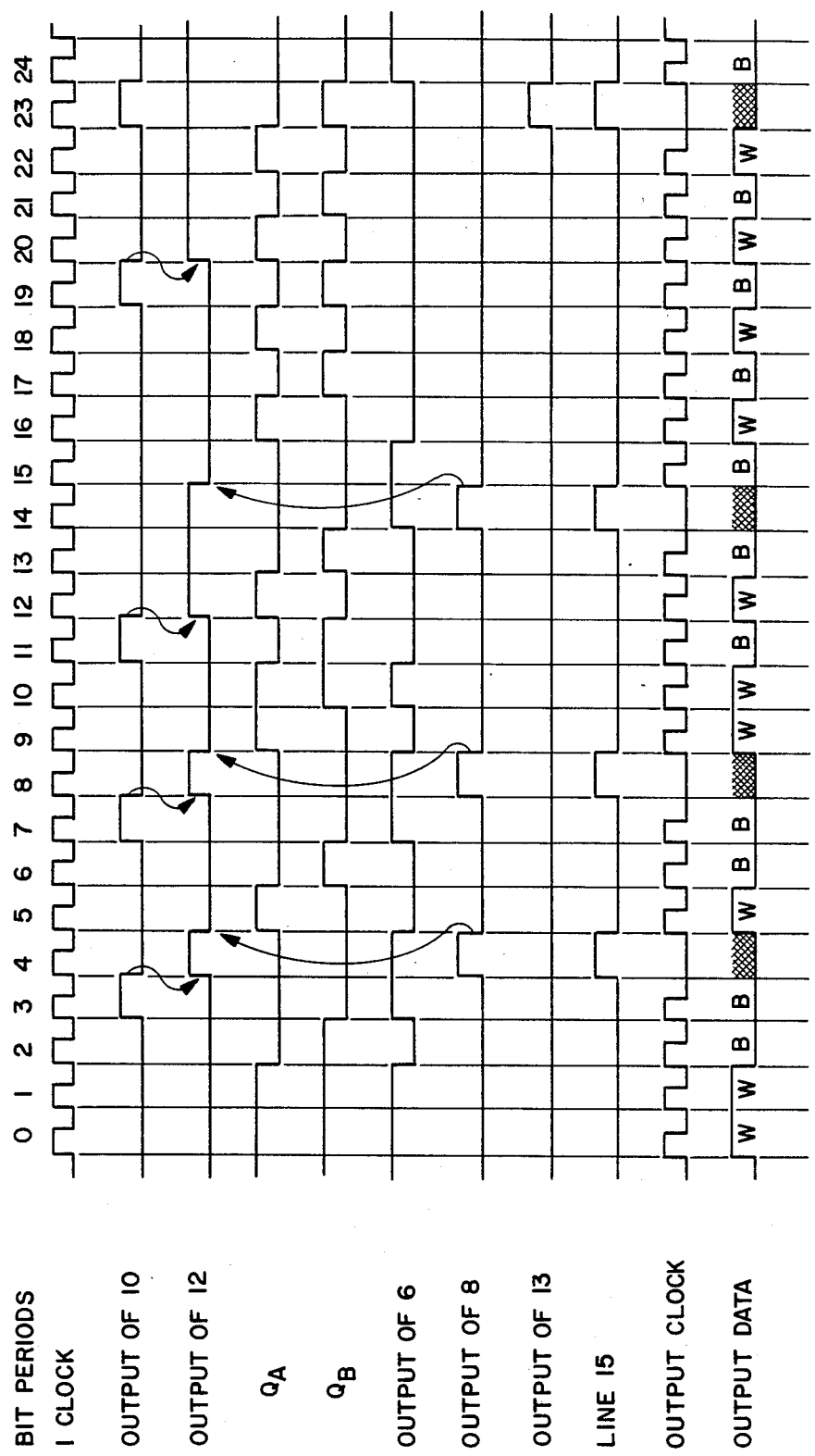

METHOD FOR CONVERTING THE NUMBER OF BITS OF INPUT BIT STREAM

FIELD OF THE INVENTION

The present invention relates to image scaling by conversion of the length of an input bit stream, which represents the visual image pattern, to a selected length in response to a given scaling conversion ratio. It has been required to enlarge or reduce a size of input image to a desired image size, for example, letter size (8½ inches by 11 inches) to metric B4 size, or vice versa.

DESCRIPTION OF THE PRIOR ART

Some approaches for the conversion of the image size has been proposed. One approach employs periodic deletion or insertion of bits wherein data bits are periodically deleted from or inserted to bit stream which represents one PEL (print element) line of the image. For example, a data bit in the bit stream is deleted every five bit positions in response to a scale conversion or reduction ratio of 4/5.

This approach, however, has an inherent problem that significant bits which might be located at every five bit are lost in the reduced bit stream, resulting in reduced image quality. Another approach uses a so-called bit conversion table. The table is prepared to minimize the loss of the significant bit transition, i.e., 1 to 0 or 0 to 1 transitions of the input image data. In the case of the conversion of B4 size having a width of 256 mm to A4 size having a width of 210 mm, the reduction ratio is represented by the formula;

$$\frac{210}{256} = 0.8203$$

To realize the ratio 0.8203, a scale conversion or reduction ratio of 5/6 is selected since a 5/6 conversion ratio provides a nearest value, as below:

$$\frac{5}{6} = 0.8333$$

The input image indicating bit stream for one horizontal scan or print line in the row direction of the B4 size image is divided into 6-bit groups. The conversion table is assembled to include all combinations of 6 bits to 5 bits conversion without the loss of image accuracy. Each 6-bit group is used as the address for accessing the table. This approach, however, has a disadvantage that it requires a relatively large memory space for the table. Japanese published patent application 55-114914 (Sanyo) discloses image scaling or conversion by the use of the above-described table.

GENERAL DESCRIPTION OF THE INVENTION

The invention relates to methods and apparatus for converting a length or bit density of input bit stream representing a visual image. The image has plural PEL (picture element) scan or print lines forming a rectangular raster pattern. Each PEL line may be serially supplied to the apparatus. The apparatus is supplied with a selected scaling or conversion ratio and to determine the number of data bits to be inserted to or deleted from each scan or print line of the input bit stream. The input bit stream is divided or partitioned into a plurality of bit groups in accordance with the conversion ratio. The number of bit groups is equal to the number of data bits to be inserted or deleted for each said scan or print line.

Scaling occurs by one data bit being inserted in or deleted from each of the bit groups. The bits in each bit group are successively determined if the adjacent two bits have the same binary value. A detection circuit is provided which produces a first output signal when the adjacent two bits have the same binary value, and produces a second output signal when the adjacent two bits have different binary value. A circuit responds to the occurrence of the first output signal in the bit group to effect an insertion of a bit adjacent the two identical bits for enlargement or a deletion of a data bit from the adjacent two identical bits for image reduction.

The insertion of one bit into the bit group or the deletion of one bit from the bit group inhibits further bit insertions or deletions in the instant bit group.

If the first output signal is not produced during the successive comparison of two bits in any bit group, that is, all of successive two bit combinations in the bit group indicate bit transitions, i.e., first bit of the two bits having one binary value and second bit having another binary value, one bit is forcibly inserted or one bit is forcibly deleted at the end of such bit group.

The above functions can also be employed in a programmable computer and are effected via program means.

The foregoing and other objects, features, and advantages of the invention will be apparent from the following more particular description of preferred embodiments of the invention, as illustrated in the accompanying drawings.

DESCRIPTION OF THE DRAWINGS

FIG. 1 is a block diagram of a circuit for scaling an image by changing the number of bits of the input bit stream in accordance with the present invention.

FIG. 2 illustrates the comparison of a reduced image in accordance with the present invention with the reduced image by prior technology.

FIG. 3 illustrates waveforms in various circuit nodes in the block diagram shown in FIG. 1.

FIG. 4 is a circuit diagram of a gate circuit of an output circuit.

FIG. 5 illustrates input and output waveforms of the gate circuit in a reduction mode and an enlarge mode.

DETAILED DESCRIPTION OF EMBODIMENT

Referring to FIG. 1, a serial-in/parallel-out shift register 1 has two stages $Q_A$ and $Q_B$. It is assumed that input bit stream shown as train A in FIG. 2 is serially applied to shift register 1 over input line 2. Clock signals are applied to shift register 1 over input line 3. Output lines 4 and 5 of shift register 1 are connected to an Exclusive OR/inverter circuit 6; circuit 6 supplies a first or second output signal over line 7 connected to one input of AND circuit 8. The output line 5 of the shift register 1 is connected to one input of an output circuit 9. The f clock signals are also applied to 6 bit rate multipliers 10. The multipliers 10 have control input terminals A through F and produce an output signal on output line 11 as described hereinafter. Output line 11 is connected to the set input terminals of set/reset flip-flop 12 and to one input of AND circuit 13. Output line 12A of flip-flop 12 is connected to another input of each of the AND circuits 8 and 13. Outputs of the AND circuits 8 and 13 go to OR circuit 14. The output of the AND circuit 8 also goes to the reset terminal of the flip-flop 12. The clock input CK of flip-flop 12 is connected to the f clock line 3. The output line 15 of the OR circuit 14 is connected to one input of each of the AND circuits 16 and 17. The AND circuit 16 has another input line 18 and the AND circuit 17 has another input line 19. Output line 20 of the AND circuit 16 and output line 21 of the AND circuit 17 are connected to the output circuit 9.

Referring to FIGS. 1, 2 and 3, the operation of the apparatus shown in the FIG. 1 is now described.

The 6-bit binary rate multipliers 10 determine the number of data bits to be inserted to or delated from 64 bits (one scan or print line) of the input data bit stream train A in response to applied control signals A through F to produce a timing control pulse train on output line 11. The control signals A–F to multipliers 10 are produced by a table 24 which responds to one of various conversion ratios, such as $B_4$ to $A_4$, $A_3$ to $A_4$, $A_3$ to $B_4$, 240 to 203, etc. As apparent from FIG. 3, the timing control pulse train from multipliers 10 partitions the input data bit stream into plural multibit groups, the number of which equals the number of the deleted or inserted bits for each successive scan or print line of a raster of pels. For example, the pattern of the timing control pulse train indicates the number of deleted or inserted bits for each set of 64 bits received over line 2.

For this description, it is assumed that a conversion ratio of 52/64 is specified by the input pattern 001100 applied to terminals F through A, and the input data bit stream is as shown in FIG. 2 is applied to the input line 2. The ratio 52/64 approximates the reduction from B4 size to A4 size as follows:

$$\frac{52}{64} = \frac{1}{2} + \frac{1}{4} + \frac{1}{16} = 0.5 +$$

$$0.25 + 0.0625 = 0.8125 = 0.81712 = \frac{A4}{B4}$$

Various input patterns specify various conversion ratios as shown in FIG. 1. The ratio 52/64 indicates that twelve bits (the difference between 64 and 52) should be deleted from 64 bits; that is, one bit should be deleted from each group of 16 input bits. It is noted that the timing control pulse train of the multipliers 10 partitions the 16 bits into three groups.

Shift register 1 and the Exclusive OR/inverter circuit 6 determine if the adjacent two bits in each bit group have the same binary value. More particularly, input data bit stream is serially applied to the stages $Q_A$ and $Q_B$. The stage $Q_A$ stores the current data bit while the stage $Q_B$ stores the immediately preceding data bit.

Both data bits are applied to the Exclusive OR/inverter circuit 6, which produces an up level or first output signal whenever both data bits are equal and produces down level or second output signal whenever the two input data bits have different binary values. In this example, the Exclusive OR/inverter circuit 6 produces the up level signals during periods, $T_0$–$T_1$, $T_3$–$T_4$, $T_7$–$T_8$, etc.

Flip-flop 12 is set by the trailing edge or negative going edge of each timing control pulse on line 11 to produce an up level signal on output line 12A. In the exemplary embodiment, flip-flop 12 is set at the beginning of periods $T_4$, $T_8$, $T_{12}$ and $T_{20}$. The 6-bit binary rate multipliers 10 and the flip-flop 12 respond to the given conversion ratio signified at input terminals A–F to determine the number of data bits to be inserted to or deleted from each 64 bit set the input bit stream in order to partition that 64 bit set into plural bit groups. The set condition of flip-flop 12 allows the succeeding reduction or enlargement operation whenever adjacent data bits are equal. Flip-flop 12 is reset by an up level signal from the AND circuit 8. This AND circuit 8 up level signal is also a gating signal which conditions the reduction or enlarge operation, as will become apparent. As stated above, AND circuit 8 is controlled by the output signals of Exclusive OR/inverter circuit 6 and flip-flop 12. AND circuit 8 is activated whenever both inputs are at the up level. This condition is satisfied at the first occurrence of the up level signal on line 7 after the occurrence of an up level at the output line 11 of flip-flop 12. This activation of AND circuit 8 is shown in periods $T_4$, $T_8$ and $T_{14}$ in FIG. 3. The up level signal of AND circuit 8 conditions AND circuits 16 and 17 through OR circuit 14 and also resets flip-flop 12 to inhibit further activation of the AND circuit 8 in the bit group being processed. Input lines 18 and 19 of AND circuits 16 and 17, respectively, receive a reduction signal or enlargement signal, respectively. The signal "reduction" is applied over line 18 when the reduction of the original image is desired, while the signal "enlargement" is applied over line 19 when the enlargement of the original image is desired.

In the exemplary reduction case, the reduction signal on line 18 is at up level while the enlarge signal is maintained at down level, whereby AND circuit 16 is activated to condition the output circuit 9 to delete a bit signal during each of the illustrated time periods $T_4$, $T_8$, $T_{14}$ and $T_{23}$ of FIG. 3.

In the case that all of the adjacent two bit combinations in a bit group have different binary values, one bit is forcibly inserted or one bit is forcibly deleted at the occurrence of the next up level signal from the multipliers 10. The example of such a bit group is shown by the bit positions 18 through 23 in the input data bit stream A in FIG. 2, in which all of the adjacent two bit combinations have different binary values. In this instance, Exclusive OR/inverter circuit 6 does not produce any up level signal on output line 7 during the processing of bits in the bit group; AND circuit 8 is therefore not activated resulting in no deletion of a bit as needed for reduction to occur. To forcibly insert or delete one bit in the constant bit group, AND circuit 13 is activated at the beginning of time period 23 by the up level signal of flip-flop 12 and the up level signal on output line 11. It is noted that flip-flop 12 maintains the up level signal on output line 12A since the flip-flop 12 has not been reset by AND circuit 8. The up level signal from the AND circuit 13 is applied to the both AND circuits 16 and 17 through OR circuit 14.

Output circuit 9 includes gate circuit 25 and a serial-parallel converter/shift register 26. The details of the gate circuit 25 are shown in FIG. 4. The gate circuit 25 includes inverter circuits 41 and 42, AND circuits 43 and 44 and OR circuit 45. Circuit 25 selectively gates the f clock signals and the 2f clock signals in response to the delete signal on output line 20 and the delay signal on output line 21, as shown in FIG. 5. In the reduction mode, AND circuit 43 is deactivated whenever the delete signal is on line 20, to inhibit f clock signal during the bit time period. The clock train on output line 23 is the sample signal or shift signal for converter 26, which is a serial-parallel converter/shift register. The data bit of train A during the above-described time period is not received by converter 26, so that the number of bits in the input bit group is reduced by one.

In the enlarge mode, the number of clock pulses on the output line 23 is increased by one for each bit group. When the delay signal on the line 21 is produced, AND circuit 44 gates the 2f clock signal on line 9A, i.e., two clock pulses during this bit period. Except during the bit period during which the delay signal is produced, AND circuit 43 gates the f clock pulses to OR circuit 45. Both clock pulse trains from AND circuits 43 and 44 are ORed by circuit 45 and shown in FIG. 5, whereby the number of clock pulses is increased by one during this bit period so that one data bit during this bit period is sampled twice; the number of the data bits in the bit group is increased by unity.

The logic processing circuit including the AND circuits 8, 13, 16 and 17, the OR circuit 14 and the output circuit 9, respond to the output signals of the Exclusive OR/inverter circuit 6 and the flip-flop 12 to insert one additional bit to the adjacent two identical bits or delete one bit from the adjacent two identical bits or forces a change at the end of a bit group if no two adjacent bits were identical.

FIG. 2 shows the comparison of the reduced output bit pattern C of the present invention with the output bit stream B reduced by the prior art periodical bit deletion. The reduction of the B4 size image to the A4 size image is shown. The bit stream B is obtained by periodically deleting the input bit every 6 bits in accordance with the 5/6 reduction ratio. It is apparent that the bit transitions "1 to 0" between the position 4 and 5, bit transition "0 to 1" between the positions 10 and 11, bit transition "1 to 0" between the positions 11 and 12, bit transition "0 to 1" between the positions 16 and 17, bit transition "1 to 0" between the the positions 17 and 18 are not included in the output bit stream B of the prior technique.

In the output bit stream C reduced by the present invention, all informationally or image significant bit transitions, which are lost in the bit stream B, are maintained, whereby the image quality is substantially improved in comparison with the bit stream B. It is particularly desirable to maintain these original significant or image bit transitions in the output bit stream, since the output bit stream would be processed by a utility apparatus, such as a data processing host apparatus. The resultant raster, accumulation of a plurality of scan or print lines into an array, are used by a visual presentation device, such as a video display terminal, dot matrix printer and the like.

The above description relates to the enlargement or reduction of the image in the row or scan direction.

The enlargement or reduction of the image in the column or transverse to the raster scan direction could be performed by storing the image, the row direction of which has been processed by the circuit of FIG. 1, to a memory by applying data bits in the column direction of the stored image to the input line 2 of the shift register 1 as the input data stream and by processing all columns of the stored image in the same manner as described.

While the invention has been particularly shown and described with reference to preferred embodiments thereof, it will be understood by those skilled in the art that various changes in form and details may be made therein without departing from the spirit and scope of the invention.

What is claimed is:

1. In a method of processing image data for scaling the image from a first size to a second size and wherein the image data includes a line of pel indicating bits in a raster of pel indicating bits representative of an image being processed, including the machine implemented steps of:
   selecting a scaling ratio for changing the size of an image to be processed;
   partitioning the pel indicating bits in said line into a plurality of bit groups equal to the number of bits to be added for enlarging said image or deleted for reducing said image from said line of pel indicating bits to approximately achieve the selected scaling ratio;
   examining each of the bit groups for finding one pair of adjacent like pel indicating bits, for enlarging the image adding a pel indicating bit equal to the found pair of examined pel indicating bits for creating three adjacent like pel indicating bits and for reduction deleting a one of said found examined adjacent like pel indicating bits; and
   when no pair of adjacent like pel indicating bits are found in any one of said bit groups, arbitrarily add or delete a pel indicating signal, respectively for enlargement or reduction of the image, from such no-pair bit groups.

2. The method set forth in claim 1 wherein said raster consists of an array of scan lines of said pel-indicating signals, further including the machine implemented steps of:
   selecting a first said scaling ratio for scaling along said scan lines and a second said scaling ratio for scaling transverse to said scan lines; and
   repeating said examining, deletion/addition of pels and arbitrary steps of claim 1 first for a one of said scaling ratios for all lines of pel indicating bits along a first dimension of said raster array and secondly another one of said scaling ratios for all lines of pel indicating bits along a second dimension of said raster array such that scaling of the image is effected independently along said respective dimensions of the raster array.

3. The method set forth in claim 2 wherein one and only one pel indicating bit is added or deleted from each and every one of said bit groups respectively for enlarging or reducing the image being processed.

4. The method set forth in claim 2 wherein said partitioning step for each of said selected scaling ratios includes partitioning the respective lines of pel indicating signals in like sized bit groups in the respective raster array dimensions.

5. The method set forth in claim 1 wherein said examining step includes Exclusive OR comparing all adjacent bits in each of said bit groups and performing said addition/deletion steps on the first occurring pair of examined like-pel indicating bits in each of said bit groups.

6. The method set forth in claim 1 wherein said partitioning step includes partitioning the line of pel indicating bits into like-sized bit groups.

7. The method set forth in claim 1 including performing said arbitrary step on the last two examined pel indicating signals of each said no-pair bit groups.

8. In an image processing apparatus for processing image representing bits to scale an image being processed and effectively having a rectangular array of pel indicating bits effectively arranged in lines of said pel-indicating bits, including, in combination:
   bit processing means for partitioning each line of said pel indicating bits into a number of bit groups equal to the number of pel indicating bits to be added to said each line for enlarging the image being processed or equal to the number of pel indicating bits to be deleted from said each line for reducing the image being processed; and group scaling means connected to said bit processing means and having means for receiving said pel indicating bits to be processed for scaling said image being processed for adding one bit to each of said bit groups for enlarging the image or deleting a bit from each of said bit groups for reducing the image and including means for examining said received pel indicating means connected to said group scaling means for making said additions or deletions of said pel indicating bits at pairs of like pel indicating bits if any occur in such bit groups.

9. In an image processing apparatus set forth in claim 8, further including, in combination:

scale change indicating means connected to said bit processing means for actuating said bit processing means to partition said lines of pel indicating signals in accordance with an indicated scale.

10. In an image processing apparatus set forth in claim 8, further including, in combination:

said received pel indicating means includes register means for storing a predetermined number of received pel indicating signals and having an Exclusive OR circuit means receiving bits from said register means to identify pairs of like-pel indicating bits; and arbitrary circuit means connected to said group scaling means and connected to said bit processing means for responding to an end of a bit group to determine if a pair of said like-pel indicating bits occurred in a just-examined bit group and if not add or delete a bit at the end of the just-examined bit group for respectively enlarging or reducing the image being processed.

11. In an image processing apparatus set forth in claim 8, further including, in combination:

table means storing a plurality of ratios for scaling an image being processed and connected to said bit processing means for actuating same to divide the line of pel indicating bits being processed in accordance with a one of said plurality of ratios identifiable with a desired scaling of an image being processed.

* * * * *